US008452856B1

(12) United States Patent
Lent et al.

(10) Patent No.: US 8,452,856 B1
(45) Date of Patent: May 28, 2013

(54) NON-DISRUPTIVE STORAGE SERVER MIGRATION

(75) Inventors: Arthur F. Lent, Newton, MA (US); Nagender Somavarapu, Bangalore (IN); Mohammed Nazeem, Andhra Pradesh (IN); Aditya Rajeev Kulkarni, Bangalore (IN); Ravikanth Dronamraju, Pleasanton, CA (US)

(73) Assignee: NetApp, Inc., Sunnyvale, CA (US)

( * ) Notice: Subject to any disclaimer, the term of this patent is extended or adjusted under 35 U.S.C. 154(b) by 362 days.

(21) Appl. No.: 12/850,486

(22) Filed: Aug. 4, 2010

(51) Int. Cl.
*G06F 15/16* (2006.01)
*G06F 15/177* (2006.01)

(52) U.S. Cl.
USPC ............................ 709/219; 709/220; 709/223

(58) Field of Classification Search
USPC ........................................ 709/248, 217–226
See application file for complete search history.

(56) References Cited

U.S. PATENT DOCUMENTS

| 6,134,580 | A * | 10/2000 | Tahara et al. ................. 709/202 |
| 7,536,526 | B2 * | 5/2009 | Srinivasan et al. ............ 711/165 |
| 7,769,722 | B1 * | 8/2010 | Bergant et al. ................ 707/681 |
| 8,060,710 | B1 * | 11/2011 | Don et al. ...................... 711/161 |
| 2005/0144521 | A1 * | 6/2005 | Werner ............................ 714/20 |
| 2008/0114854 | A1 * | 5/2008 | Wong et al. ................... 709/214 |
| 2009/0037679 | A1 * | 2/2009 | Kaushik et al. ............... 711/162 |
| 2009/0144389 | A1 * | 6/2009 | Sakuta ........................... 709/215 |

* cited by examiner

*Primary Examiner* — Joshua Joo
(74) *Attorney, Agent, or Firm* — Perkins Coie LLP

(57) ABSTRACT

The techniques introduced here provide a storage server migration that is non-disruptive to client applications. The techniques described here allow the migration of data from a source storage server to a destination storage server without the need for planned downtime typically associated with storage server migration. Using the techniques described here, data migration operations are performed while client applications continue to run and access data from the source storage server. Once data migration operations are complete, all applications and clients are transitioned to the destination storage server without disruption to the client applications.

27 Claims, 8 Drawing Sheets

NON-DISRUPTIVE STORAGE SERVER MIGRATION

FIELD OF THE INVENTION

At least one embodiment of the present invention pertains to network storage systems, and more particularly, to migration of a storage server without disruption to a client application.

BACKGROUND

A storage controller is a physical processing device that is used to store and retrieve data on behalf of one or more hosts. A network storage controller can be configured (e.g., by hardware, software, firmware, or any combination thereof) to operate as a storage server that serves one or more clients on a network, to store and manage data in a set of mass storage devices, such as magnetic or optical storage-based disks, tapes, or flash memory. Some storage servers are designed to service file-level requests from hosts, as is commonly the case with file servers used in a network attached storage (NAS) environment. Other storage servers are designed to service block-level requests from hosts, as with storage servers used in a storage area network (SAN) environment. Still other storage servers are capable of servicing both file-level requests and block-level requests, as is the case with certain storage servers made by NetApp®, Inc. of Sunnyvale, Calif., employing the Data ONTAP® storage operating system.

Storage server migration from one storage controller to another is often desirable for maintaining a robust network storage environment. A storage server migration includes moving data, including storage server configuration data, and client access to that data from one storage controller to a second storage controller. A storage server migration can be performed for many reasons, including storage capacity growth, equipment lifecycle management, storage server technology and software upgrades, and storage system load balancing. A conventional storage server migration process requires storage servers and client applications to be shut down and reconfigured. However, the requirement to keep storage servers running makes a conventional storage server migration inconvenient, and migration becomes impractical as cloud computing and server virtualization become more prevalent.

SUMMARY

The techniques introduced here provide a storage server migration that is non-disruptive to a client application. The techniques allow the migration of data access from a source storage server to a destination storage server without the need for planned downtime normally associated with storage server migration. Using the techniques introduced here, data migration operations are performed while the client application continues to run and access data from the source storage server. Once data migration operations are complete, the client application is transitioned to access data provided by the destination storage server without the need for reconfiguration.

The techniques introduced here include creating a baseline copy of the data and storage server configuration information from the source storage server on the destination storage server. The techniques further include creating a synchronous mirroring relationship between the source storage server and the destination storage server such that all data written to the source storage server and all of the configuration changes made to the source storage server are reflected on the destination storage server. Additionally, the techniques introduced here include transitioning access from the source storage server to the destination storage server within a protocol specified timeout period such that the client application is not disrupted. However, the client application will perceive the brief transition as a temporary I/O pause which is not considered disruptive because data access is restored to the client application without reconfiguring or restarting the client application.

Other aspects of the techniques summarized above will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

Figure 1:
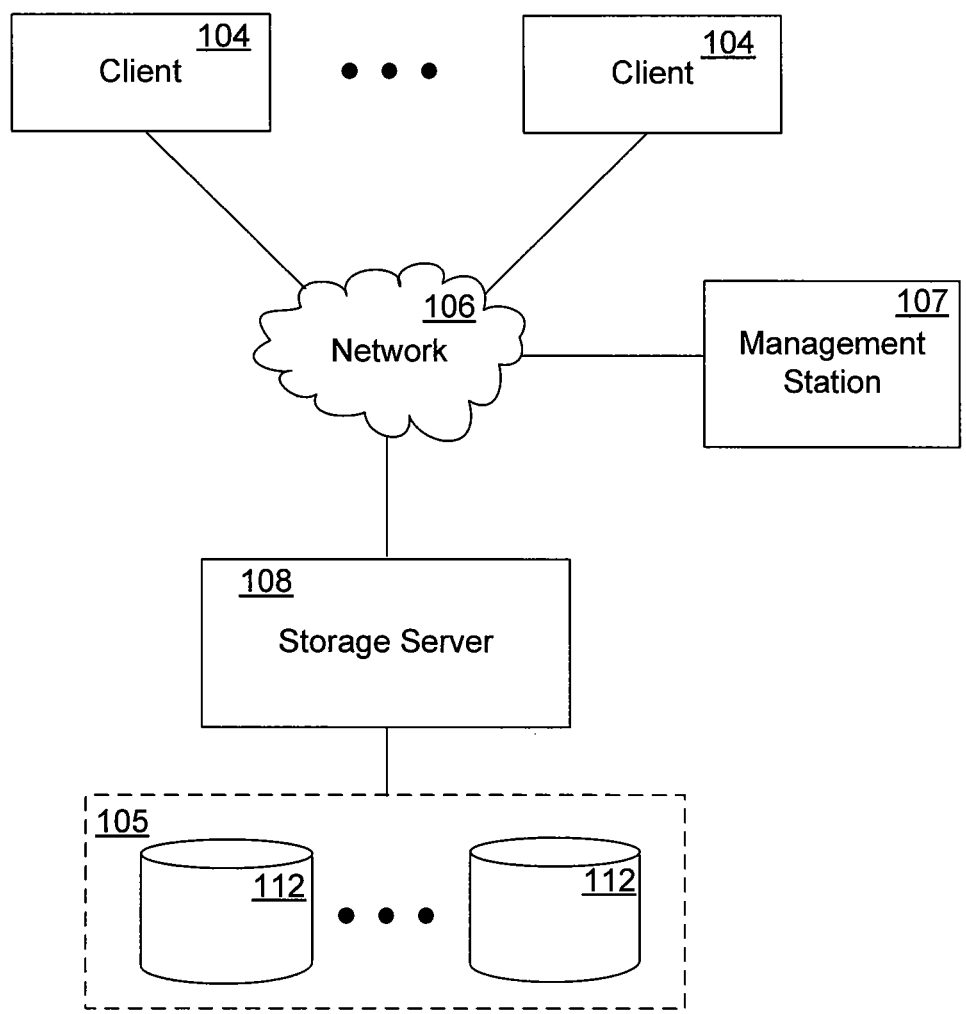
FIG. 1 shows an example of a network storage system.

FIG. 1 shows an example of a network storage system, which includes a plurality of client systems 104, a storage server 108, and computer network 106 connecting the client systems 104 and the storage server 108. As shown in FIG. 1, a storage controller configured as a storage server 108 is coupled to a number of mass storage devices 112, such as disks, in a mass storage subsystem 105. Alternatively, some or all of the mass storage devices 112 can be other types of storage, such as flash memory, solid-state drives (SSDs), tape storage, etc. However, for ease of description, the storage devices 112 are assumed to be disks herein.

The storage server 108 can be, for example, one of the FAS-series of storage server products available from NetApp®, Inc. The client systems 104 are connected to the storage server 108 via the computer network 106, which can be a packet-switched network, for example, a local area network (LAN) or wide area network (WAN). Further, the storage server 108 can be connected to the disks 112 via a switching fabric (not shown), which can be a fiber distributed data interface (FDDI) network, for example. It is noted that, within the network data storage environment, any other suitable number of storage servers and/or mass storage devices, and/or any other suitable network technologies, may be employed.

The storage server 108 can make some or all of the storage space on the disk(s) 112 available to the client systems 104 in a conventional manner. For example, each of the disks 112 can be implemented as an individual disk, multiple disks (e.g., a RAID group) or any other suitable mass storage device (s). The storage server 108 can communicate with the client systems 104 according to well-known protocols, such as the Network File System (NFS) protocol or the Common Internet File System (CIFS) protocol, to make data stored on the disks 112 available to users and/or application programs. The storage server 108 can present or export data stored on the disks 112 as volumes, to each of the client systems 104. Various functions and configuration settings of the storage server 108 can be controlled by a user, e.g., a storage administrator, from a management station 107 coupled to the network 106.

Figure 2:
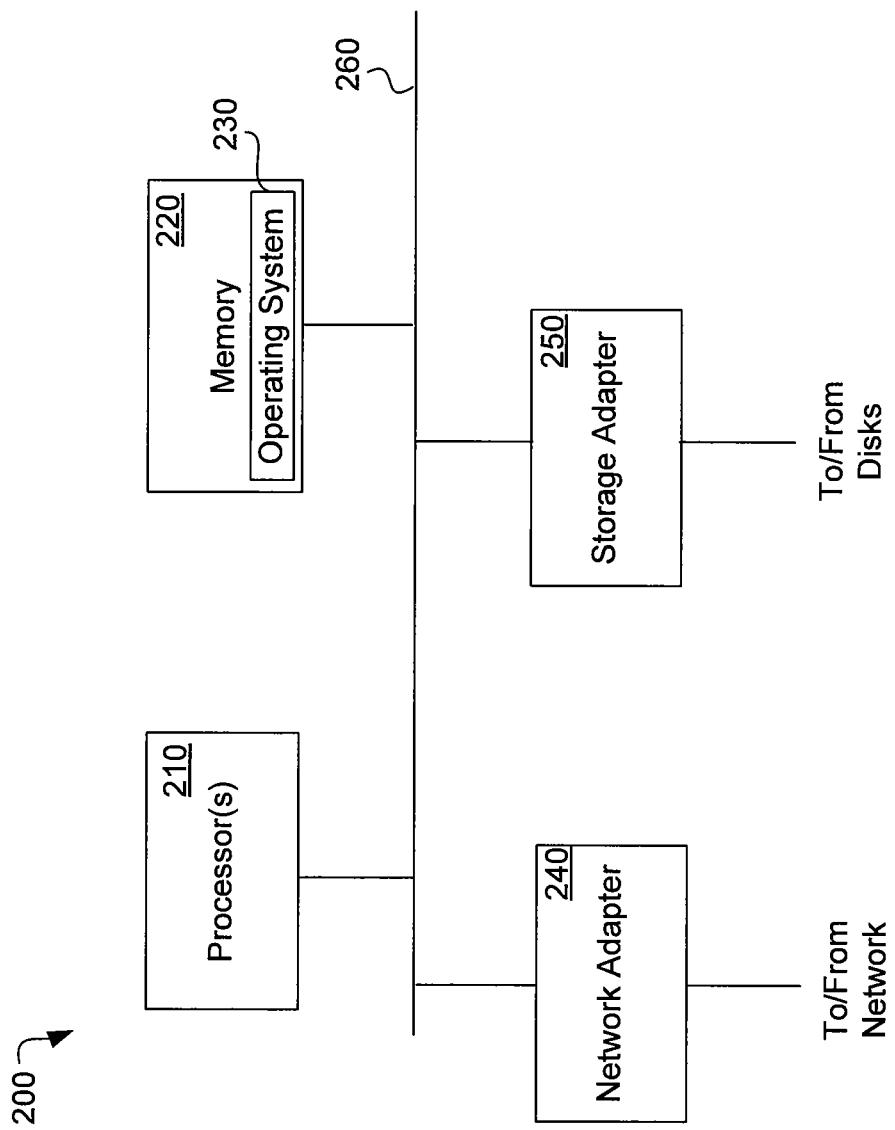
FIG. 2 is a diagram illustrating an example of a storage controller that can implement one or more network storage servers.

FIG. 2 is a diagram illustrating an example of a storage controller that can implement one or more network storage servers 108. In an illustrative embodiment, the storage controller 200 includes a processor subsystem 210 that includes one or more processors. The storage controller 200 further includes a memory 220, a network adapter 240, and a storage adapter 250, all interconnected by an interconnect 260.

The storage controller 200 can be embodied as a single- or multi-processor storage system executing a storage operating system 230 that preferably implements a high-level module, called a storage manager, to logically organize the information as a hierarchical structure of named directories, files, and special types of files called virtual disks (hereinafter generally "blocks") on the disks 112.

The memory 220 illustratively comprises storage locations that are addressable by the processor(s) 210 and adapters 240 and 250 for storing software program code and data associated with the techniques introduced here. The processor 210 and adapters may, in turn, comprise processing elements and/or logic circuitry configured to execute the software code and manipulate the data structures. The storage operating system 230, portions of which are typically resident in memory and executed by the processing elements, functionally organizes the storage controller 200 by (among other things) invoking storage operations in support of the storage service provided by the storage server 108. It will be apparent to those skilled in the art that other processing and memory implementations, including various computer readable storage media, may be used for storing and executing program instructions pertaining to the technique introduced here.

The network adapter 240 includes a plurality of ports to couple the storage controller 200 with one or more clients 104 over point-to-point links, wide area networks, virtual private networks implemented over a public network (Internet) or a shared local area network. The network adapter 240 thus can include the mechanical, electrical and signaling circuitry needed to connect the storage controller 200 to the network 106. Illustratively, the network 106 can be embodied as an Ethernet network or a Fibre Channel (FC) network. Each client 104 can communicate with the storage server over the network 106 by exchanging discrete frames or packets of data according to pre-defined protocols, such as TCP/IP.

The storage adapter 250 cooperates with the storage operating system 230 to access information requested by the clients 104. The information may be stored on any type of attached array of writable storage media, such as magnetic disk or tape, optical disk (e.g., CD-ROM or DVD), flash memory, solid-state drive (SSD), electronic random access memory (RAM), micro-electro mechanical and/or any other similar media adapted to store information, including data and parity information. However, as illustratively described herein, the information is stored on disks 112. The storage adapter 250 includes a plurality of ports having input/output (I/O) interface circuitry that couples with the disks over an I/O interconnect arrangement, such as a conventional high-performance, Fibre Channel (FC) link topology.

Storage of information on disks 112 can be implemented as one or more storage volumes that include a collection of physical storage disks cooperating to define an overall logical arrangement of volume block number (VBN) space on the volume(s). The disks 112 can be organized as a RAID group. One or more RAID groups together form an aggregate. An aggregate can contain one or more volumes.

The storage operating system 230 facilitates clients' access to data stored on the disks 112. In certain embodiments, the storage operating system 230 implements a write-anywhere file system that cooperates with one or more virtualization modules to "virtualize" the storage space provided by disks 112. In certain embodiments, a storage manager 310 (FIG. 3) element of the storage operation system 230 logically organizes the information as a hierarchical structure of named directories and files on the disks 112. Each "on-disk" file may be implemented as a set of disk blocks configured to store information. The virtualization module(s) may allow the storage manager 310 to further logically organize information as a hierarchical structure of blocks on the disks that are exported as named logical unit numbers (LUNs).

Figure 3:
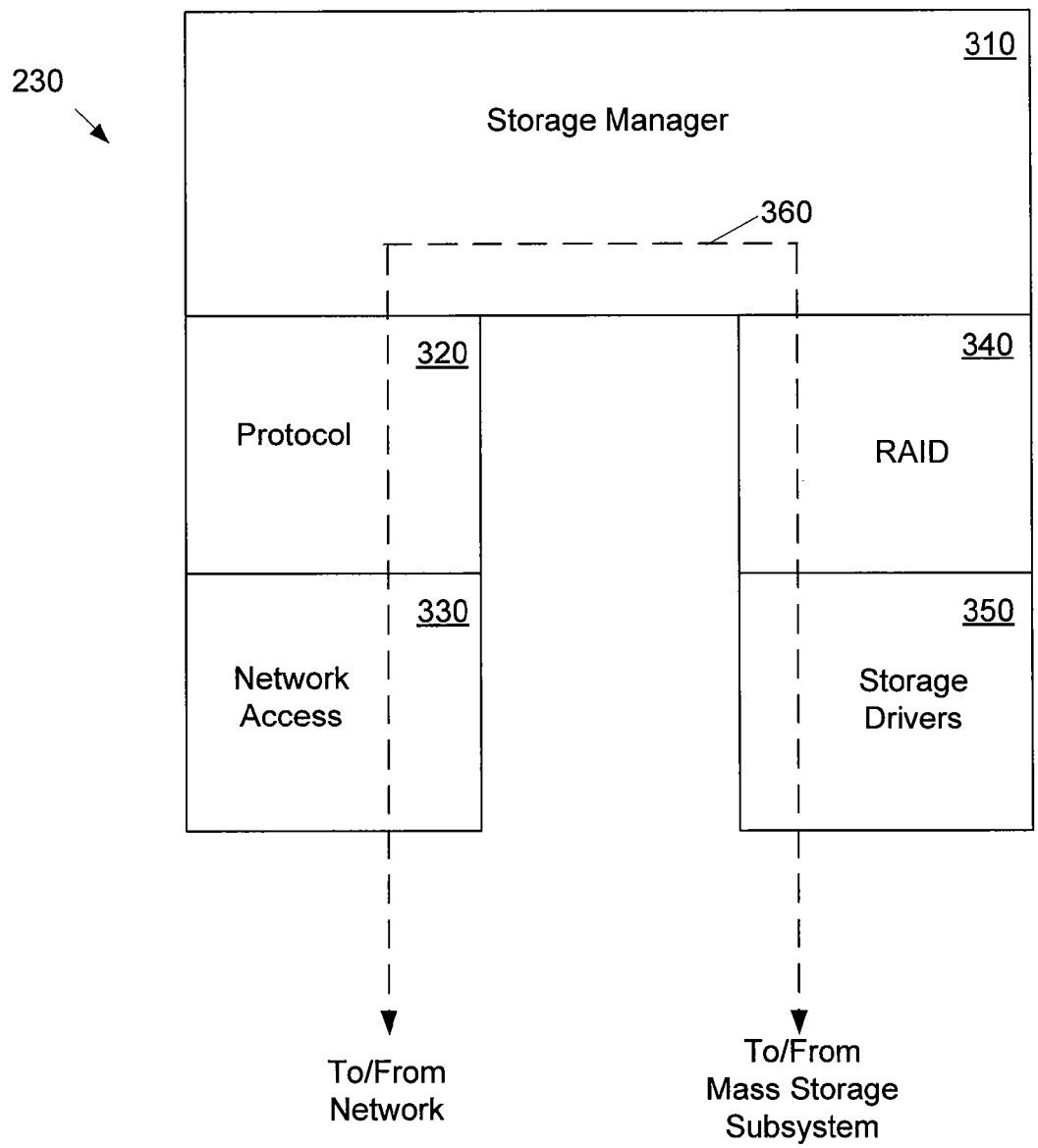
FIG. 3 schematically illustrates an example of the architecture of a storage server operating system.

FIG. 3 schematically illustrates an example of the architecture of a storage server operating system 230. The storage operating system 230 can be implemented in programmable circuitry programmed with software and/or firmware, or in specially designed non-programmable circuitry, or in a combination thereof. In the illustrated embodiment, the storage operating system 230 includes several modules, or layers. These layers include a storage manager 310, which is the core functional element of the storage operating system 230. The storage manager 310 imposes a structure (e.g., one or more file systems) on the data managed by the storage server 108 and services read and write requests from clients 104.

To allow the storage server to communicate over the network 106 (e.g., with clients 104), the storage operating system 230 also includes a multi-protocol layer 320 and a network access layer 330, logically under the storage manager 310. The multi-protocol layer 320 implements various higher-level network protocols, such as Network File System (NFS), Common Internet File System (CIFS), Hypertext Transfer Protocol (HTTP), Internet small computer system interface (iSCSI), and/or backup/mirroring protocols. The network access layer 330 includes one or more network drivers that implement one or more lower-level protocols to communicate over the network, such as Ethernet, Internet Protocol (IP), Transport Control Protocol/Internet Protocol (TCP/IP), Fibre Channel Protocol (FCP) and/or User Datagram Protocol/Internet Protocol (UDP/IP).

Also, to allow the device to communicate with a storage subsystem (e.g., storage subsystem 105), the storage operating system 230 includes a storage access layer 340 and an associated storage driver layer 350 logically under the storage manager 310. The storage access layer 340 implements a higher-level storage redundancy algorithm, such as RAID-4, RAID-5 or RAID-DP. The storage driver layer 350 implements a lower-level storage device access protocol, such as Fibre Channel Protocol (FCP) or small computer system interface (SCSI).

Also shown in FIG. 3 is the path 360 of data flow through the storage operating system 230, associated with a read or write operation, from the client interface to the storage interface. Thus, the storage manager 310 accesses the storage subsystem 105 through the storage access layer 340 and the storage driver layer 350.

The storage operating system 230 can have a distributed architecture. For example, the protocol layer 320 and network access layer 330 can be contained in an N-module (e.g., N-blade) while the storage manager 310, storage access layer 340 and storage driver layer 350 are contained in a separate D-module (e.g., D-blade). In such cases, the N-module and D-module (not shown) communicate with each other (and, possibly, with other N- and D-modules) through some form of physical interconnect and collectively form a storage server node. Such a storage server node may be connected with one or more other storage server nodes to form a highly scalable storage server cluster.

Figure 4:
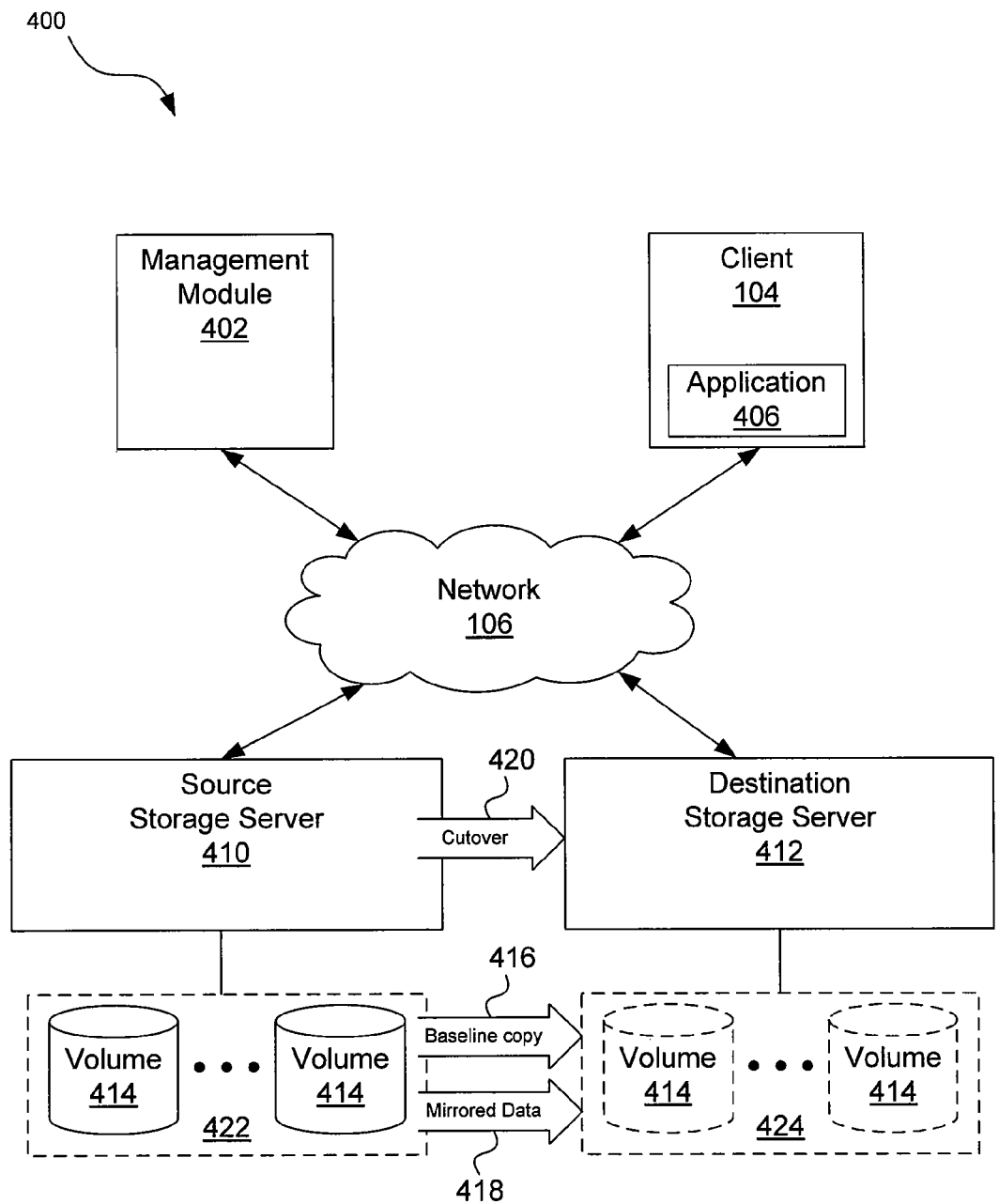
FIG. 4A shows an example of a network storage system performing a storage server migration according to the techniques introduced here.
FIG. 4B shows an example of a network storage system including a plurality of virtual servers performing a storage server migration according to the techniques introduced here.
Figure 4:
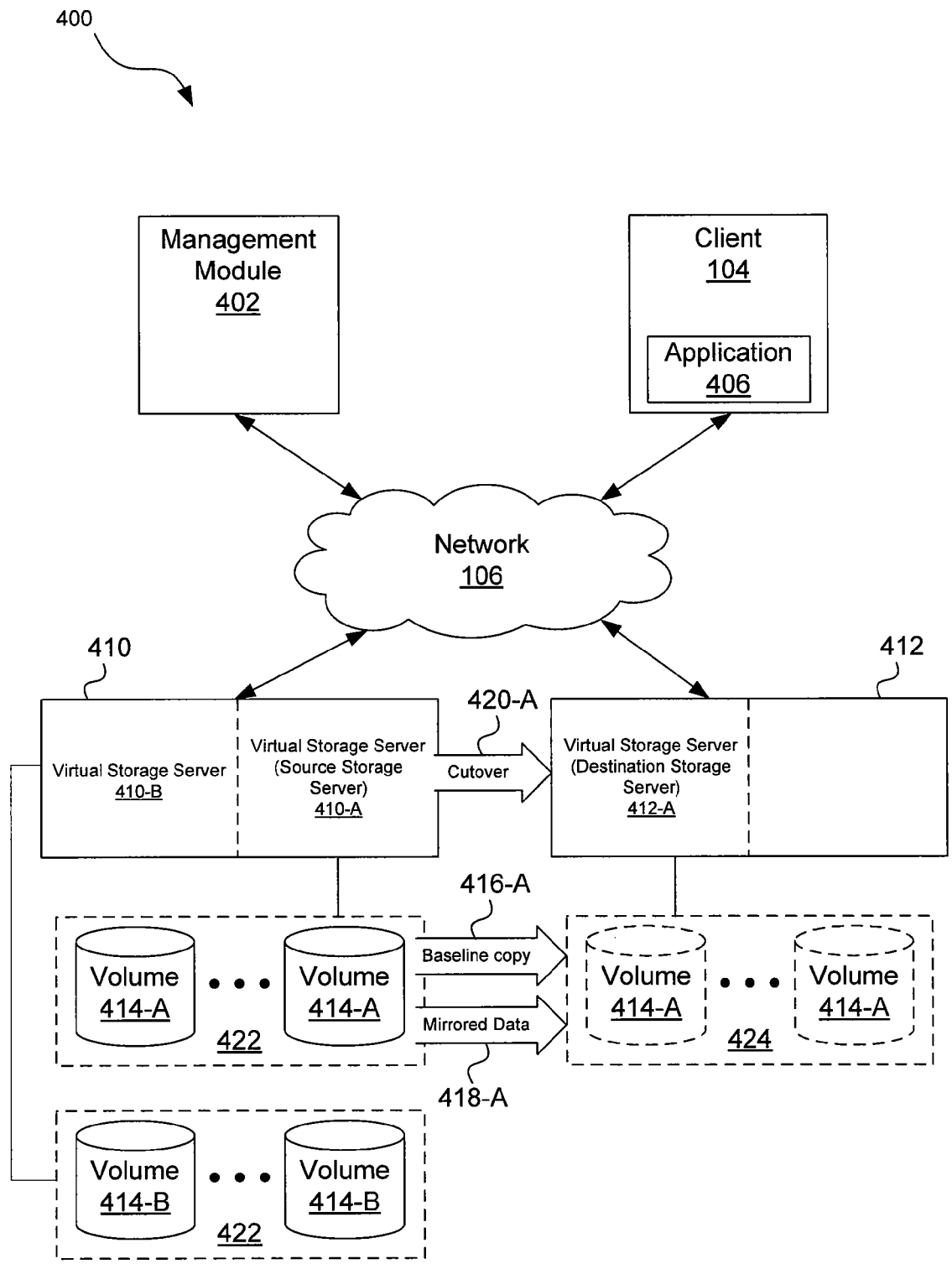

FIG. 4A shows an example of a network storage system performing a storage server migration according to the techniques introduced here. The network storage system 400 includes a client 104, a management module 402, a network 106, a source storage server 410, and a destination storage server 412. The client system 104 includes an application 406 which has access via source storage server 410 to data stored on volumes 414 in the mass storage subsystem 422 of the source storage server 410.

In one embodiment, the management module 402 is included in the management station 107. A network administrator can initiate a migration of client access from the source storage server 410 to the destination storage server 412 using the management module 402 via the management station 107. The migration includes a number of steps that are outlined in more detail below but are shown at a high level in FIG. 4A. The management module causes the source storage server 410 to transfer a baseline copy 416 of the volumes 414 included in the mass storage subsystem 422 of the source storage server 410 to the mass storage subsystem 424 of the destination storage server 412. The baseline copy includes configuration information data stored on the volumes 414 of the source storage server 410. The configuration information includes the root volume information and IP address information stored on the volumes of the source storage, server 410. While the process herein is described with reference to IP networks, it should be understood that other communication protocols can also be implemented with the system, e.g., Fibre Channel or Fiber Channel over Ethernet, and therefore other storage addresses, e.g., WWPNs and WWNNs, would be included in the root volume information.

After the baseline copy 416 has been created on the destination storage server 412, the management module 402 causes a synchronous mirroring relationship to be established between the source storage server 410 and the destination storage server 412 by sending a command to each server, such that data written to the source storage server 410 is mirrored 418 to the destination storage server 412. The mirroring relationship established between the source storage server 410 and the destination storage server 412 ensures that all data written to the source storage server 410, including modification of data already stored on the source storage server, is replicated on the destination storage server 412.

When the volumes 414 at both the source storage server 410 and the destination storage server 412 have reached a synchronized state, where the data on the destination storage server 412 matches the data on the source storage server 410, the storage system is ready to cutover 420. The cutover 420 is a transition of data access and administrative access from the source storage server 410 to the destination storage server 412. The techniques introduced here allow the cutover to happen in a manner which is non-disruptive to the client application 406. The client application 406 is not aware of the migration and does not need to be restarted or reconfigured after the cutover when the destination storage server 412 starts serving data to the client application 406. During the brief cutover period, storage server access will not be available to client application 104. However, the unavailability appears to the client application 104 as a temporary I/O pause. This temporary I/O pause is still considered non-disruptive because the client application 104 resumes I/O access (from the destination storage server 412 instead of the source storage server 410) without having to be restarted or reconfigured when the cutover is complete. In a conventional storage system migration, the client applications must be shut down, restarted, and reconfigured prior to accessing data from the destination storage server. The network protocol the client application uses to access data on the storage server determines how the client application reacts to this I/O pause. For example, a client application using an NFS or iSCSI protocol will keep retrying to access the source storage server 410 until the cutover is completed. When the cutover is completed, the client application 406 begins to access data from the destination storage server 412.

FIG. 4B shows an example of a network storage system, including a plurality of virtual servers, performing a storage server migration according to the techniques introduced here. Virtual servers allow the sharing of the underlying physical server resources, e.g., processors and memory, between virtual servers while allowing each virtual server to run its own operating system (thereby providing functional isolation). Multiple server operating systems that previously ran on individual machines, in order to avoid interference, are now able to run on the same physical machine because of the functional isolation provided by a virtual server. This can be a more cost effective way of providing storage server solutions to multiple clients than providing separate physical server resources for each client.

In the example of FIG. 4B, the storage controller 410 includes virtual storage servers 410-A and 410-B. As described above, the virtual storage servers share physical resources of the storage controller while each one runs its own operating system. Each virtual storage server manages volumes 414 on a mass storage subsystem 422. The migration of a virtual storage server happens in a similar manner to that described above with reference to FIG. 4A. However, only a portion of the volumes, 414-A (those associated with the virtual server 410-A), are included in the baseline copy to the mass storage subsystem 424 of the destination storage server 412 and the cutover takes place to a virtual destination storage server 412-A located on the storage controller 412. The remaining steps in the migration of virtual source storage server 410-A correspond to the steps described above with respect to source storage server 410.

In the embodiments described herein, a virtual source storage server 410-A is migrated to another virtual storage server, i.e., virtual destination storage server 412-A. In alternative embodiments, however, using the technique introduced here, a virtual source storage server could potentially be migrated to a physical storage server, or a physical source storage server could be migrated to a virtual storage server.

Figure 5A:
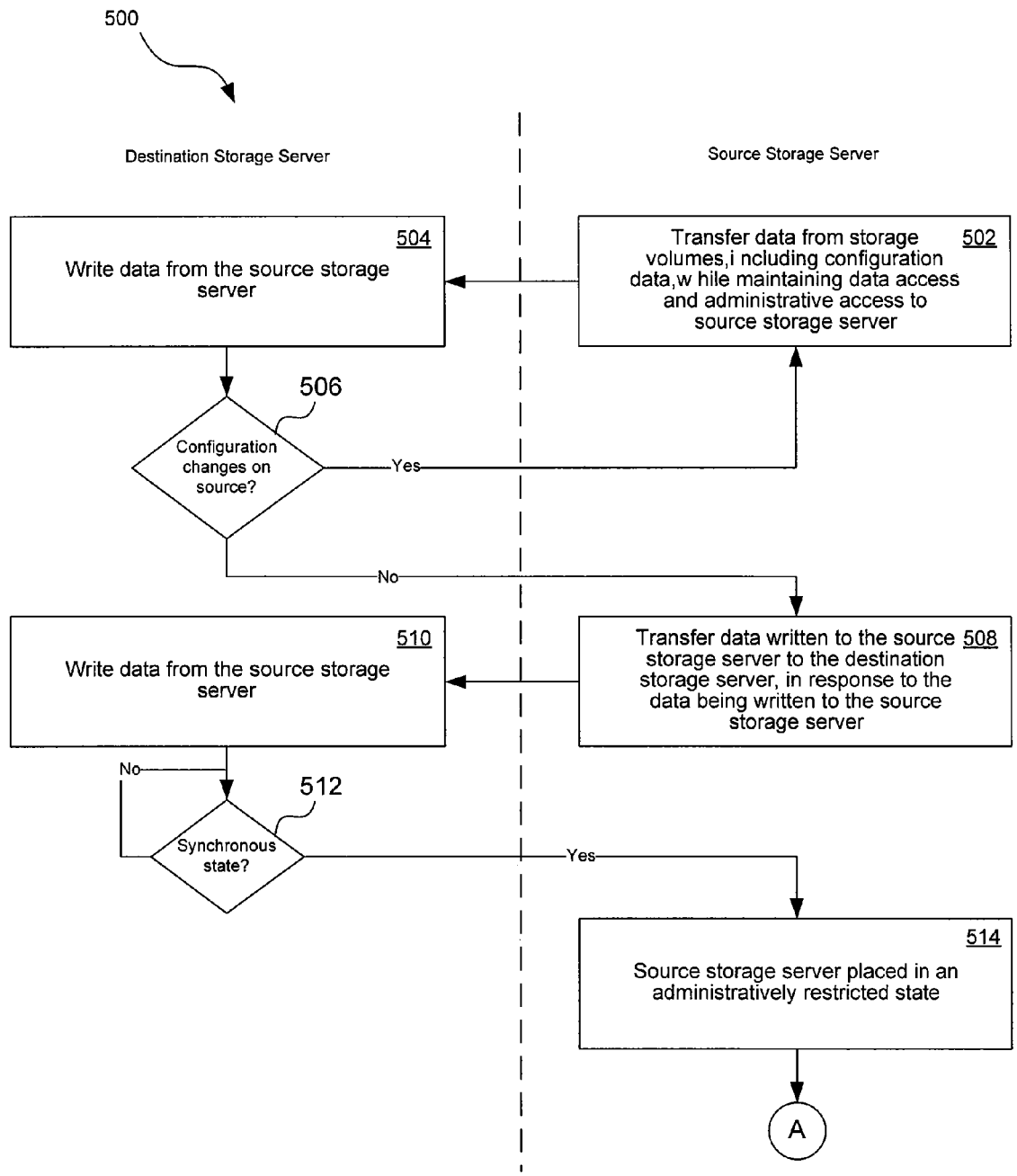
FIG. 5A is a flow diagram of a process leading up to a cutover period for a non-disruptive storage server migration.
Figure 5:
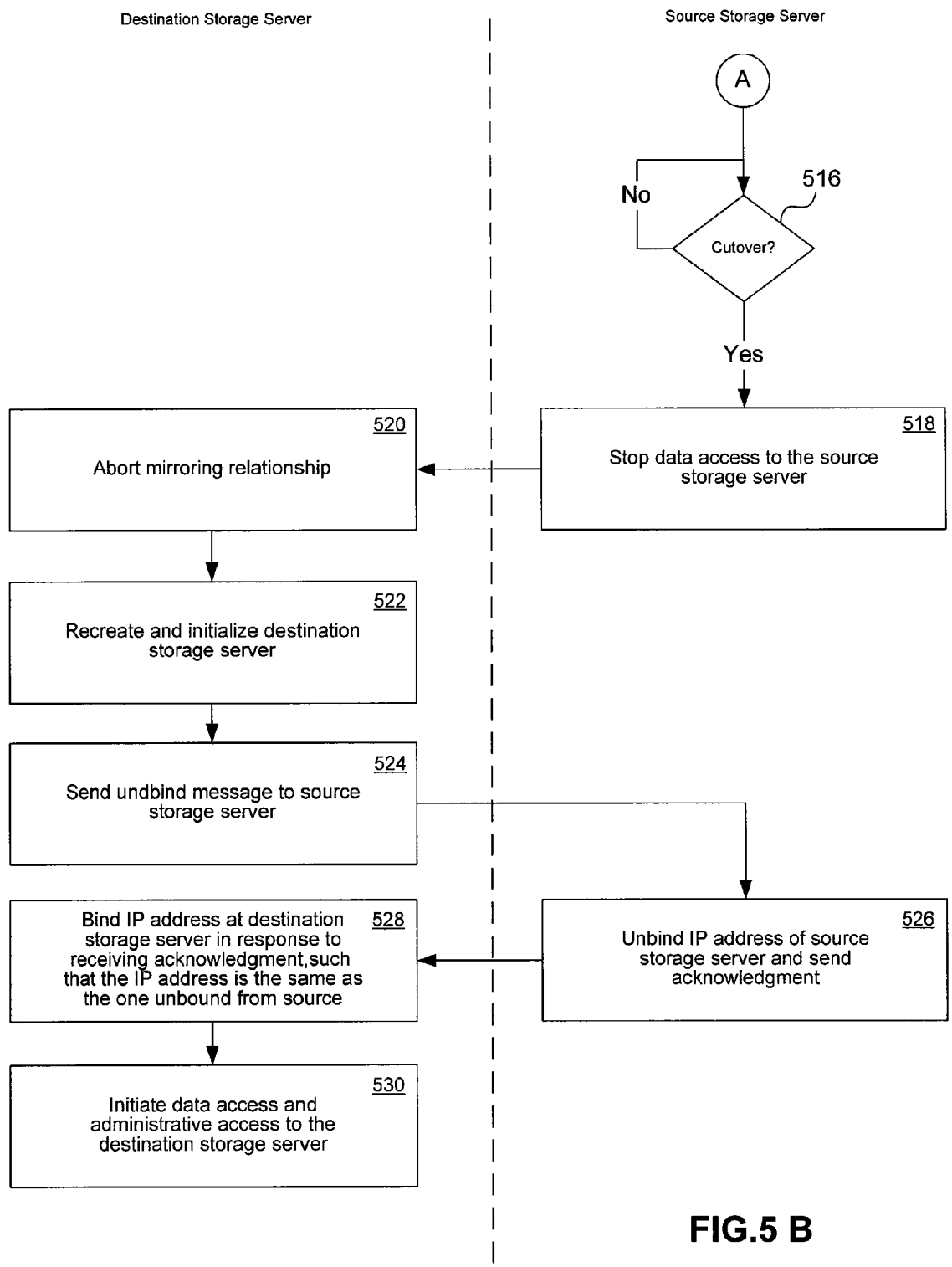
FIG. 5B is a flow diagram of a process during a cutover period, during which access from a source storage server is cutover to a destination storage server.

FIG. 5A is a flow diagram of a process leading up to a cutover period for a non-disruptive storage server migration.

The process is organized as a sequence of operations in the flowchart 500. However, it should be understood that at least some of the operations associated with this process can potentially be reordered, supplemented, or substituted for while still performing the same overall technique.

In one embodiment, the migration process is initiated by a network administrator using the management module 402. The network administrator can select a source storage server 410 to be migrated and a destination storage server 412 to which the source storage server 410 is to be migrated. The management module 402 then sends a message to the source storage server 410 and the destination storage server 412 to start the migration. In response to the message from the management module 402, the destination storage server 412 is temporarily configured to facilitate the transfer of data from the source storage server 410 to the destination storage server 412. The destination storage server 412 is placed into a migrating state, meaning that it is not currently serving data to the client application 406. In one embodiment, a temporary destination virtual server is created at the destination storage server 412 to receive the data transferred from the source storage server 410.

In response to receiving the message from the management module 402 the source storage server 410, at 502, begins transferring data to the destination storage server 412. The destination storage server 412, at 504, writes the data to local storage devices of the destination storage server 412 such that a baseline copy of the volumes managed by the source storage server 410 is made. The baseline copy includes configuration information, for example, the root volume information and IP address information, stored on the volumes of the source storage server 410. During the creation of the baseline copy, the source storage server 410 is in a running state, such that the client application 406 has data access to the source storage server 410. While the source storage server 410 is in the running state, a client 104 has administrative access to the source storage server.

The process continues to 506 where the management module 402 checks to determine whether any configuration changes have been made to the source storage server 410 since the migration was initiated. This ensures that configuration changes, such as new volumes added to the source storage server 410 or new IP addresses assigned to the source storage server 410, are included in the baseline copy on the destination storage server 412. If there have been configuration changes, 506—Yes, then the process returns to step 502 and the changes are incorporated into the baseline copy created on the destination storage server 412.

If there have not been any configuration changes, 506—No, then the process continues to 508 where a synchronous mirroring relationship is established between the source storage server 410 and the destination storage server 412. While the storage servers are in the synchronous mirroring relationship, at 508, in response to new data written to the source storage server 410 (e.g., by a client), a copy of the new data is written, at 510, to the destination storage server 412. "New" data can include the modification of existing data. This ensures that any subsequent configuration or data changes to the source storage server 410 are reflected in the data on the destination storage server 412. In one embodiment, data stored on the source storage server 410 which was not included in the baseline copy and is not new data continues to be transferred while the storage servers are in the synchronous mirroring relationship. While the storage servers are in the synchronous mirroring relationship, the source storage server 410 remains in the running state, such that client application 406 has data access to the source storage server 410, and the destination storage server 412 remains in the migrating state. While the source storage server 410 is in the running state a client 104 has administrative access to the source storage server.

The process continues to 512 where the management module 402 determines whether the source storage server 410 and the destination storage server 412 have reached a synchronous state, i.e., the data on the volumes of the destination storage server 412 is an accurate reflection of the data on the volumes of the source storage server 410. If the management module 402 determines that the storage servers are not in a synchronous state, 512—No, then the synchronous mirroring relationship continues until the management module 402 determines that a synchronous state has been reached, the data contained on the destination storage server 412 is the same as the data contained on the source storage server. Note that some data from the source storage server 410 may be in transit to the destination storage server 412 when the management module 402 determines that a synchronous state has been reached. A synchronous state, or where data contained on the destination storage server 412 and the source storage server 410 is substantially the same, in this case can be defined as a state such that all data written to the source storage server 410 will be present on the destination storage server 412 prior to completion of the cutover. Thus, all data on the source storage server 410 does not need to be contained on the destination storage server 412 for a synchronous state to be reached, but the transfer is such that all data will be present prior to completion of the cutover.

When it is determined that a synchronous state has been reached, 512—Yes, the process continues to 514 where the source storage server 410 is put into an administratively restricted state, such that users do not have administrative access to the source storage server 410, in preparation for a cutover from the source storage server 410 to the destination storage server 412. While the source storage server 410 is in this administratively restricted state, users can not make administrative changes to the source storage server, e.g., no storage objects can be added to or removed from the source storage server, no new storage addresses can be configured for the source storage server, etc. In one embodiment, some administrative changes that do not affect the migration can be allowed while the source storage server 410 is in the administratively restricted state. However, while the source storage server 410 is in the administratively restricted state, the source storage server 410 continues to serve data to the client application 406. This administratively restricted state prevents any configuration changes to the source storage server 410 so that all configuration changes are reflected on the volumes of the destination storage server 412.

FIG. 5B is a flow diagram of a process during a cutover period, during which access from a source storage server is cutover to a destination storage server. The process is a continuation of the flowchart 500 and is organized as a sequence of operations in the flowchart 500. However, it should be understood that at least some of the operations associated with this process can potentially be reordered, supplemented, or substituted for while still performing the same overall technique.

The process begins at 516 with the source storage server 410 waiting for an indication from the management module 402 for the cutover to take place. During this period, 516—No, the management module 402 determines whether the source storage server 410 and the destination storage server 412 are ready to complete the non-disruptive migration. The source storage server 410 is considered ready to complete the migration when no administrative operations are running on the source storage server 410.

While administrative access to the source storage server 410 has been stopped at 514, any administrative operation that was started before 514 continues to run. The operation continues to run until completion, at which time the management module 402 will issue a cutover command to the source storage server 410 and the destination storage server 412. In one embodiment, the management module 402 can abort the running administrative operation and issue the cutover command. In another embodiment, if the running operation cannot or should not be aborted and the completion time is too long, administrative access to the source storage server 410 is restored and the migration is delayed until the operation is completed.

The management module 402 issues a cutover command, 516—Yes, when the management module determines that the source storage server 410 and the destination storage server 412 are ready for cutover and all running operations have been completed or aborted. At 518 the source storage server 410 is put into a migrating state and data access by client application 406 is stopped. While data access and administrative access to the source storage server 410 has been stopped at this point, the synchronous mirroring relationship between the source storage server 410 and the destination storage server 412 remains, such that all of the data written to the source storage server 410 before access was stopped is reflected on the destination storage server 412.

At 520, after all of the data written to the source storage server 410 prior to data access being stopped has reached the destination storage server 412, the synchronous mirroring relationship is aborted and no more data passes between the source storage server 410 and the destination storage server 412. The synchronous mirroring relationship is aborted in order to prepare the volumes 414 at the destination storage server 412 for recreation of the source storage server configuration on the destination storage server 412.

At 522 the temporary configuration of the destination storage server 412 is destroyed and the source storage server configuration is recreated on the destination storage server 412 such that the destination storage server 412 would appear to the client application 406 to be the same storage server as the source storage server 410. The volumes 414 copied from the source storage server 410 are brought online at the destination storage server 412. The configuration information included on the volumes 414 is used to initialize the sub-systems of the destination storage server 412 such that the sub-systems are in the same configuration as they were on the source storage server 410. Once the destination storage server 412 has been recreated and initialized, at 524, the destination storage server 412 sends a message to the source storage server 410 to unbind the storage address of the source storage server 410, which was used by client 104 to access the source storage server 410. For clarity of description it is assumed throughout this example that the storage address is an IP address. However, other communication protocols and their related storage addresses are considered in this description.

At 526, in response to receiving the message from the destination storage server 412, the source storage server 410 unbinds the IP address and sends an acknowledgment to the destination storage server 412. At 528 the destination storage server 412 receives the acknowledgment from the source storage server 410 and binds the IP address of the destination storage server 412. The IP address at the destination storage server 412 is now the same IP address that was unbound from the source storage server. Because of this connection between the IP addresses, the client application 406 can begin to access data from the destination storage server 412 without reconfiguration. At 530 the destination storage server 412 is brought online and the client application 406 begins to access data from the destination storage server 412.

During the cutover period, the client application 406 will not have access to either the source storage server 410 or the destination storage server 412. This cutover period appears to the client application 406 as an I/O pause. This temporary I/O pause can still be considered non-disruptive because the client application 104 resumes I/O access (from the destination storage server 412 instead of the source storage server 410) without having to be restarted or reconfigured when the cutover is complete and thus the operation of the application is not interrupted. An interruption to the client application as used herein is defined as timing out, restarting, reconfiguring, or any state which requires user input to correct. In a conventional migration, client applications must be shut down, restarted, and/or reconfigured prior to accessing data from the destination storage server. The protocol the client application uses to access data on the storage server determines how the client application reacts to this I/O pause. For example, a client application using an NFS or iSCSI protocol will keep retrying to access the source storage server 410 until the destination storage server 412 is brought online, at which point the destination storage server 412 will service the client application 406.

While the client application 406 sees an I/O pause during the cutover, the migration is non-disruptive because the client application 406 will not have to be shut down and/or reconfigured prior to access being initiated at the destination storage server 412. However, the length of the cutover period is constrained by a protocol specified timeout period. For example, the NFS and iSCSI protocols typically have a timeout period of no longer than 120 seconds. If storage server access to the client application 406 is not restored within this protocol specified timeout period, the client application 406 will timeout and the migration can no longer be considered non-disruptive. Thus, it is important to know in advance the protocol timeout periods and to monitor the cutover process to determine whether a successful migration will complete within the protocol specified timeout period.

Figure 6:
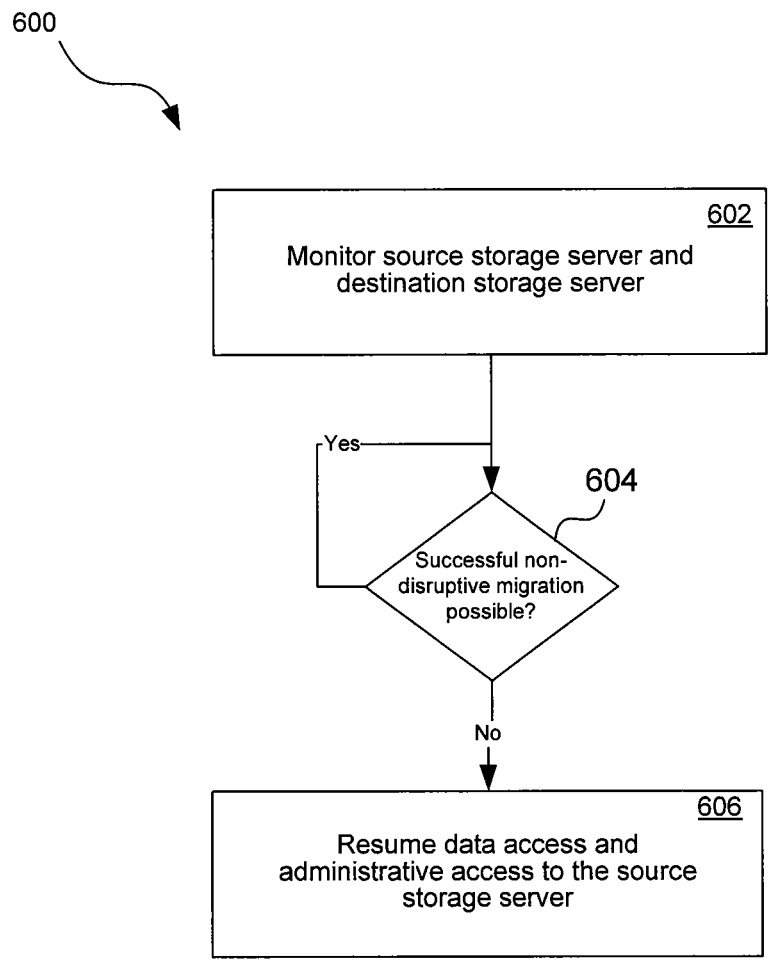
FIG. 6 is a flow diagram of a process for monitoring the cutover of access from a source storage server to a destination storage server.

FIG. 6 is a flow diagram of a process for monitoring the cutover of access from a source storage server to a destination storage server. The process begins at 602 where the source storage server 410 and the destination storage server 412 begin to monitor the cutover process. The monitoring begins prior to the initiation of the cutover process. In one embodiment, a monitoring thread, independent from the migration, can run on each of the source storage server 410 and the destination storage server 412. During each step in the cutover process, at 604, the monitoring thread can check to determine whether it is still possible to complete a successful non-disruptive migration. The checks performed by the monitoring thread include timing each step, checking for error conditions, monitoring a heartbeat of the source storage server 410 and the destination storage server 412, and estimating how much time remains for a non-disruptive migration to complete.

Prior to initiating the cutover, a time budget for each step of the migration can be determined. The monitoring thread monitors each step to determine whether it will complete within the time budget. If the monitoring thread determines that the step will not be able to complete within the time budget, a successful non-disruptive migration will not be possible, 604—No, and at 606 the source storage server 410 resumes serving data and administrative access is restored to the client application 406. In one embodiment, a portion of the protocol specified timeout period is reserved for the fallback procedure of 606 so that the client application 406 is not disrupted even when the migration is aborted.

Similarly, if an error occurs during any of the migration steps, for example, data that was corrupted during the transfer of the baseline copy makes configuration of the volumes on the destination storage server 410 not possible within the non-disruptive time period, the migration will be aborted and client application access restored to the source storage server 410.

During the cutover period the monitoring threads running on the source storage server 410 and the destination storage server 412 periodically send a heartbeat message to one another. This heartbeat message confirms that both the source and destination storage servers are running. If either the source or the destination storage server does not receive a heartbeat from the other storage server for a specified period of time, the cutover will abort and data access and administrative access will be restored to the source storage server 410.

The techniques introduced above can be implemented by programmable circuitry programmed or configured by software and/or firmware, or they can be implemented by entirely by special-purpose "hardwired" circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for implementing the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

The invention claimed is:

1. A method for non-disruptive migration of a storage server, comprising:
   creating a baseline copy of a source storage server, including storage server configuration information, on a destination storage server, wherein a client application has data access to the source storage server;
   mirroring data written to the source storage server, on the destination storage server, in response to the data being written to the source storage server;
   performing a migration from the source storage server to the destination storage server, wherein the migration does not require reconfiguring the client application prior to the client application accessing data from the destination storage server; and
   monitoring whether the migration can be successfully completed within an allotted cutover period, wherein a portion of the allotted cutover period is reserved for performing a fallback procedure if the migration cannot be successfully completed within the allotted cutover period.

2. The method of claim 1 wherein the source storage server and the destination storage server are virtual storage servers.

3. The method of claim 1, wherein performing the migration includes stopping data access and administrative access to the source storage server without disruption to the client application during the allotted cutover period.

4. The method of claim 3, wherein in response to a determination that the migration cannot be successfully completed within the allotted cutover period, the data access and the administrative access are restored to the source storage server.

5. The method of claim 1 wherein the allotted cutover period is less than or equal to a protocol timeout period.

6. The method of claim 1 wherein performing the migration includes unbinding a first storage address from the source storage server and configuring a second storage address at the destination storage server during the cutover period, wherein the second storage address is the same as the first storage address.

7. The method of claim 6, wherein performing the migration further includes initiating data access and administrative access to the destination storage server, without client side reconfiguration, upon completion of the cutover period.

8. The method of claim 1 wherein reconfiguring the client application includes restarting the client application and configuring storage addresses.

9. A network storage system comprising:
   a source storage server including a plurality of data volumes;
   a destination storage server; and
   wherein the source storage server and the destination storage server are configured to perform a migration of the plurality of data volumes and access to the plurality of data volumes from the source storage server to the destination storage server, the migration including monitoring whether the migration can be successfully completed within a cutover period that includes a reserved period for performing a fallback procedure if the migration cannot be successfully completed within the cutover period, wherein the migration occurs without reconfiguring a client application prior to the client application accessing data from the destination storage server.

10. The network storage system of claim 9, wherein the source storage server and the destination storage server are virtual storage servers.

11. The network storage system of claim 9, wherein the cutover period is an allotted non-disruptive time limit for the migration.

12. The network storage system of claim 11, wherein the allotted non-disruptive time limit is less than or equal to a protocol specified timeout period.

13. The network storage system of claim 9, wherein the migration further includes transferring an storage address from the source storage server to the destination storage server during the cutover period.

14. The network storage system of claim 13, wherein the migration further includes stopping data access and administrative access to the source storage server during the cutover period without disruption to the client application.

15. The network storage system of claim 14, wherein the migration further includes resuming the data access and the administrative access to the source storage server in response to a determination that a successful migration will not be completed within the cutover period.

16. The network storage system of claim 15, wherein the migration further includes initiating data access and administrative access to the destination storage server, without client side reconfiguration, upon completion of the cutover period.

17. The network storage system of claim 9 wherein reconfiguring the client application includes restarting the client application and configuring storage addresses.

18. A method for non-disruptive migration of a storage server, comprising:
  creating a copy of data from a source storage server on a destination storage server while maintaining client data access and administrative access to the source storage server;
  mirroring data written to the source storage server, on the destination storage server, in response to the data being written to the source storage server;
  stopping data access and administrative access to the source storage server without interrupting operation of client applications, in response to the data on the source storage server and the destination storage server reaching a synchronized state; and
  monitoring a cutover period to determine whether a migration will complete within an allotted non-disruptive time limit for the cutover period, wherein a portion of the cutover period is reserved for performing a fallback procedure if the migration cannot be successfully completed within the cutover period;
    wherein, in response to a determination that the migration will not complete within the allotted non-disruptive time limit, restoring the data access and the administrative access to the source storage server; and
    wherein, in response to a determination that the migration will complete within the allotted non-disruptive time limit, initializing the destination storage server to begin serving data and initiating data access and administrative access to the destination storage server without client side reconfiguration.

19. The method of claim 18 wherein the source storage server and the destination storage server are virtual storage servers.

20. The method of claim 18 wherein initializing the destination storage server comprises releasing a first storage address from the source storage server and configuring a second storage address to the destination storage server, wherein the second storage address configured at the destination storage server is the same as the first storage address released from the source storage server.

21. The method of claim 18 wherein the allotted non-disruptive time limit for the cutover period is less than or equal to a protocol specified timeout period.

22. A network storage server system comprising:
  a source storage server and a destination storage server, each including:
    a network interface through which to communicate with a client application over a network;
    a storage interface through which to communicate with a nonvolatile mass storage subsystem; and
    a processor configured to cause the network storage server system to perform a plurality of operations, including:
      transferring a copy, including storage server configuration information, of the mass storage subsystem of the source storage server from the source storage server to the destination storage server, wherein the client application continues to access data from the source storage server;
      mirroring data written to the source storage server, on the destination storage server, in response to the data being written to the source storage server; and
      performing a cutover from data access and administrative access provided by the source storage server to data access and administrative access provided by the destination storage server without interrupting operation of the client application, wherein performing the cutover includes determining whether the cutover can be successfully completed within an cutover period that includes a reserved period for performing a fallback procedure if the cutover cannot be successfully completed within the cutover period.

23. The network storage server system of claim 22, wherein the source storage server and the destination storage server are virtual storage servers.

24. The network storage system of claim 22, wherein determining whether the cutover can be successfully completed includes determining if a step associated with the cutover has been completed within a portion of the cutover period budgeted for the step.

25. The network storage system of claim 24, wherein the cutover period is less than or equal to a protocol specified timeout period.

26. The network storage system of claim 22, wherein the plurality of operations further includes transferring an storage address from the source storage server to the destination storage server during the cutover period.

27. The network storage system of claim 26, wherein the plurality of operations further includes resuming the data access and the administrative access to the source storage server when the cutover will not be completed within the cutover period.

* * * * *